United States Patent [19]

Hakoi

[11] E Patent Number: Re. 31,751

[45] Reissued Date of Patent: Dec. 4, 1984

[54] APPARATUS FOR LOADING A PULL TAB ON A SLIDER BODY

[75] Inventor: Tsutomu Hakoi, Kurobe, Japan

[73] Assignee: Yoshida Kogyo K. K., Tokyo, Japan

[21] Appl. No.: 546,106

[22] Filed: Oct. 27, 1983

Related U.S. Patent Documents

Reissue of:

[64] Patent No.: 4,296,547
Issued: Oct. 27, 1981
Appl. No.: 106,041
Filed: Dec. 21, 1979

[30] Foreign Application Priority Data

Dec. 29, 1978 [JP] Japan ..... 53-165293
Dec. 29, 1978 [JP] Japan ..... 53-165294

[51] Int. Cl.[3] ..... B23P 19/00
[52] U.S. Cl. ..... 29/766
[58] Field of Search ..... 29/33.2, 408, 409, 707, 29/710, 714, 766, 768, 785, 788, 792, 796, 809

[56] References Cited

U.S. PATENT DOCUMENTS

| | | | |
|---|---|---|---|
| 2,287,263 | 6/1942 | Nedal | 29/768 |
| 2,693,217 | 11/1954 | Lange | 29/766 |
| 2,825,126 | 3/1958 | Legat et al. | 29/409 X |
| 3,138,852 | 6/1964 | Mazura | 29/409 X |
| 3,234,635 | 2/1966 | Jakob | 29/766 X |
| 4,135,285 | 1/1979 | Weiner | 29/409 |

*Primary Examiner*—E. Michael Combs

*Attorney, Agent, or Firm*—Hill, Van Santen, Steadman & Simpson

[57] ABSTRACT

An apparatus for loading a pull tab on a slider body in a machine for progressively assembling sliders for slide fasteners is disclosed. The machine comprises a base, a turret supported on the base so as to rotate about its center axis and has a plurality of spaced-apart recesses arranged circumferentially around and on the turret for receiving and holding a slider body, a plurality of assembling stations arranged around the periphery of the turret, and means for intermittently rotating the turret so as to position the slider body holding recess successively opposite each of the stations. The apparatus is disposed at one of the assembling stations and comprises a pull tab supply means and a pull tab holding means. The pull tab supply means includes a holder provided on the base, a chute supported by the holder and extending substantially vertically for receiving longitudinally aligned pull tabs therein and directing them toward a pull tab receiving portion in the recess by gravity, and means for discharging pull tabs one by one from the chute. The pull tab holding means is positioned between the outlet of said chute and the pull tab receiving portion of the recess and is movable between an advanced position and a retracted position. The pull tab holding means forms a guide channel for pull tabs discharged from the chute between the outlet of the chute and the pull tab receiving portion of the recess in the advanced position and the guide channel is opened in the retracted position to thereby release the pull tab therefrom.

3 Claims, 3 Drawing Figures

APPARATUS FOR LOADING A PULL TAB ON A SLIDER BODY

Matter enclosed in heavy brackets [ ] appears in the original patent but forms no part of this reissue specification; matter printed in italics indicates the additions made by reissue.

BACKGROUND OF THE INVENTION

This invention relates to an apparatus for loading a pull tab on a slider body in a machine for progressively assembling sliders for slide fasteners.

Various types of machines for progressively assembling sliders for slide fasteners are known. Typical of such machines is the slider assembling machine which includes a base, a turret rotatably supported on the base and a plurality of spaced-apart recesses arranged circumferentially around and on the turret for receiving and holding a slider body. A plurality of assembling stations are arranged around the periphery of the turret, and means are provided for intermittently rotating the turret so as to position the slider body holding recess successively opposite each of the stations. The pull tab loading station is one of the assemblying stations of such machine and there the pull tabs are automatically supplied and attached to the slider body in the turret recess. One example of a slider assembling machine which includes a pull tab loading station is shown in U.S. Pat. No. 3,138,852. However, in the machine of this U.S. Patent, the pull tab supply chute which guides pull tabs from the hopper to the pull tab loading position is arcuate and the pull tab is supplied horizontally to the loading position. Therefore, the pull tab must be supplied by use of specific supply means which is rather complicated and requires a specific drive source. Also, in the machine of the U.S. Patent, a detecting means which detects absence of the slider body in the turret recess and stops supply of the pull tab to the loading position is provided. However, the detecting means of the U.S. Patent uses an electric sensor and stopper. Therefore, the detecting means is very likely to cause trouble and, also, it needs a specific electric energy source. Further, in the machine of this type, it is necessary to have the pull tab fall down on the slider body in a predetermined fashion when it is loaded on the same in preparation for the next working station. Namely, at the next station, the pull tab loaded on the slider body is detected by the sensor and is fixed to the slider body by caulking operation in falled down state.

SUMMARY OF THE INVENTION

Therefore, an object of this invention is to provide an apparatus for loading a pull tab on a slider body which is very simple in construction and does not need a specific drive source.

Another object of this invention is to provide an apparatus for loading a pull tab on a slider body whereby the pull tab is supplied to the proper position on the slider body one by one by gravity.

Still another object of this invention is to provide an apparatus for loading a pull tab on a slider body whereby, without trouble and without a special energy source, the supplying of a pull tab to the loading position is positively prevented when there is no slider body in the turret recess.

A further object of this invention is to provide an apparatus for loading a pull tab on a slider body whereby the pull tab positively falls down on the slider body in a predetermined fashion when it is loaded on the same.

The present invention may be summarized as an apparatus for loading a pull tab on a slider body in a machine for progressively assembling sliders for slide fasteners; the machine comprises a base, a turret supported on the base so as to rotate about its center axis and having a plurality of spaced-apart recesses arranged circumferentially around and on said turret for receiving and holding a slider body, a plurality of assembling stations arranged around the periphery of the turret, and means for intermittently rotating the turret so as to position the slider body holding recess successively opposite each of the stations; the apparatus being at one of the assembling stations, and comprising a pull tab supply means and a pull tab holding means; the pull tab supply means includes a holder provided on the base, a chute supported by the holder and extending substantially vertically for receiving longitudinally aligned pull tabs therein and directing them toward a pull tab receiving portion in the recess by gravity, and means for discharging pull tabs one by one from the chute; the pull tab holding means being positioned between the outlet of the chute and the pull tab receiving portion of the recess and being movable between advanced position and a retracted position, the pull tab holding means forms a guide channel for pull tabs discharged from the chute between the outlet of the chute and the pull tab receiving portion of the recess in the advanced position and the guide channel is opened in the retracted position to thereby release the pull tab therefrom.

DESCRIPTION OF THE PREFERRED EMBODIMENT

Hereinafter, one preferred embodiment of this invention will be explained with reference to the drawings.

Figure 1:
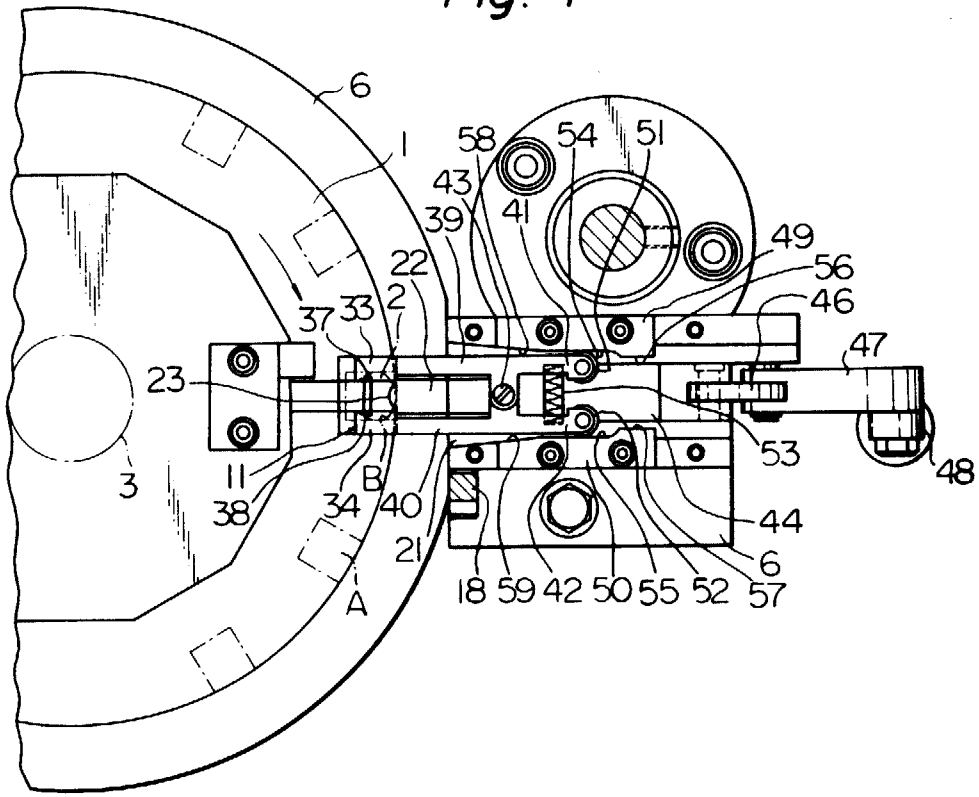
FIG. 1 is a plan view of one preferred embodiment of the invention.

FIG. 1 shows a pull tab loading station of a machine for progressively assembling sliders for slide fasteners. The machine includes a turret 1 which is rotatably supported on a base 6. The turret 1 includes on its periphery a plurality of evenly spaced-apart recesses A, B,— for receiving a slider body 2 therein. A plurality of assembling and or working stations, which are not shown except for the pull tab loading station, are spaced and arranged around the periphery of the turret 1. The turret 1 is intermittently rotated about its central axis by a drive means not shown to thereby position the slider body holding recess successively opposite each of the stations. By this, the slider body 2 in the recess is subjected to the successive assembling and/or working. In each station, the assembling and/or working operation is started and/or effected by the up and down movement of a central shaft 3 of the turret 1. In the state of FIG. 1, the slider body 2 in the recess B is positioned at the pull tab loading station.

Figure 2:
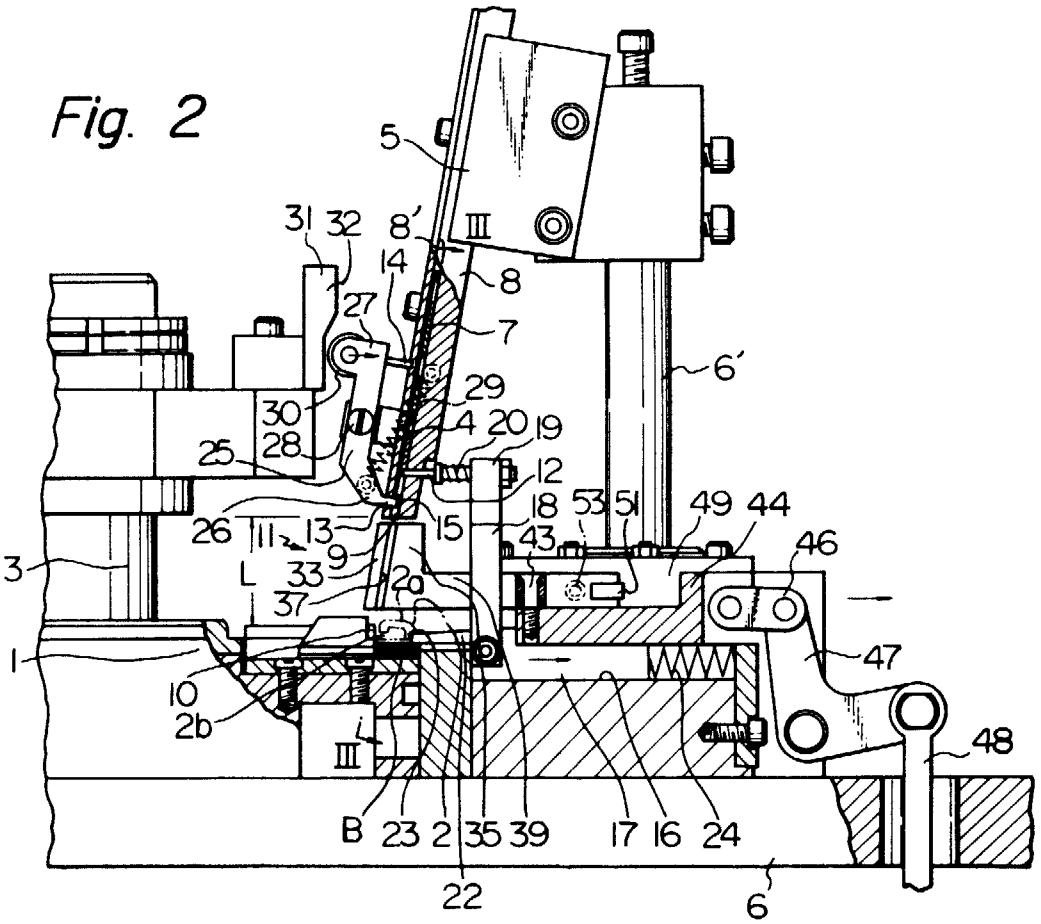
FIG. 2 is a side view of the apparatus shown in FIG. 1 with several portions broken away.

As shown in FIG. 2, in this pull tab loading station, a pull tab holder 5 is provided on the post 6′ which is fixed on the base 6 so that the holder 5 is substantially positioned above the recess B. A chute 8 which extends substantially vertically is supported by the holder 5. The chute 8 includes a groove 8' which receives longitudinally aligned pull tabs 4, 7—from the parts feeder (not shown) therein, which parts feeder is positioned above the chute 8. A lower end outlet 9 of the groove 8' is directed toward a pull tab receiving portion 10 of the recess B. Between the outlet 9 of the chute 8 and the pull tab receiving portion 10, there is disposed a pull tab holding means 11, which will be referred to hereinafter in detail.

In order to discharge the pull tabs from the groove 8' of the chute 8 one by one, the chute 8 includes a first pin 12, a second pin 13 and a third pin 14 all of which can extend into the groove 8'. The first pin 12 extend through the chute 8 into the groove 8' from the backside thereof so that its forward end can be engaged in the attaching hole 4a of the lower most pull tab 4. The second pin 13 extends through the chute 8 into the groove 8' from the front side thereof so that its forward end can engage the lower end 15 of the lowermost pull tab 4. And the third pin 14 extends through the chute 8 into the groove 8' from the front side thereof so that its forward end can be engaged in the attaching hole 7a of the next above adjacent pull tab 7.

The first pin 12 is resiliently attached to an upper arm 19 of a C-frame 18 through a spring 20, and the frame 18 is fixed to a sliding body 17 which is slidably received within a channel 16 formed in the base 6. The sliding body 17 is normally urged toward the recess B by means of the spring 24.

The frame 18 also includes a lower arm 21. This lower arm 21 is provided with a detector 22 which extends toward the recess B in the turret 1. The arcuate leading edge 23 of the detector 22, in its projecting position, projects into the moving pass of the slider body 2 in the recess B, which movement is caused by rotation of the turret 1. Therefore, when the arcuate leading edge 23 is positioned in its projecting position and the turret 1 is rotated so that the recess B come to the pull tab loading station, the slider body 2 in the recess B contacts the arcuate leading edge 23 and pushes the lower arm 21 and the frame 18 in the direction of the arrow in FIG. 2. By this, the first pin 12 is retracted so as to be disengaged from the lowermost pull tab 4.

When the arcuate leading edge 23 and the slider body 2 becomes disengaged, the sliding body 17 is pushed toward the recess B by the action of the spring 24. By this, the first pin 12 returns to its original position where it engages the lowermost pull tab. Of course, the arcuate leading end 23 of the detector 22 returns to its extended position where it projects within the moving path of the slider body.

When, by the rotation of the turret 1, a recess B which does not hold a slider body 2 therein comes to the pull tab loading station, the arcuate leading edge 23 of the detector is not deviated from its projected position, and thus the first pin 12 is not retracted from its extended position. Therefore, the supplying of a pull tab from the groove 8' is prevented.

On the other hand, the second pin 13 and the third pin 14 are fixed on the opposite ends 26, 27 of a rocking arm 25, and this rocking arm 25 is swingably supported at its intermediate portion to the chute 8 by means of the pin 28. One end of the rocking arm 25 is pulled by a spring 29, which is connected between one end 26 of the arm 25 and the chute 8, so that the second pin 13 normally engages the lower end 15 of the lowermost pull tab 4. By this pulling action of the spring 29, the third pin 14 fixed on the other end 27 of the rocking arm 25 is urged to its normal position where the forward end of the third pin does not engage the next pull tab 7 adjacent the lowermost pull tab 4.

A rotatable cam follower 30 is pivoted at the end 27 of the rocking arm 25 on the opposite side of the third pin 14. On the other hand, a cam 31 is fixed to the up and down movable shaft 3. The cam follower 30 is positioned within the path of the up and down movement of the projecting portion 32 of the cam 31.

Therefore, when the shaft 3 is lowered after a recess B is positioned at the pull tab loading station, the cam follower 30 is pushed by the lowering cam projection 32. By this, the rocking arm 25 is rotated in the direction of the arrow against the resilient force of the spring 29, and thereby the third pin 14 is brought to engage in the attaching hole 7a of the pull tab 7 and the second pin 13 is brought to disengage from the lower end 15 of the lowermost pull tab 4. To the contrary, when the shaft 3 is moved upwardly, the cam projection 32 disengage from the cam follower and the rocking arm 25 is returned to the position in FIG. 2 by the action of the spring 29.

The space L which is greater than the length 1 of the pull tab is provided between the outlet 9 of the chute 8 and the pull tab receiving portion 10 of the recess B, and the aforementioned pull tab holding means 11 is disposed within this space L. The pull tab holding means 11 includes a pair of laterally disposed clamping members 33, 34.

These clamping members 33, 34 include on their opposed inside walls 35, 36 (only 35 is shown) slots 37, 38 respectively. These slots 37, 38 define a pull tab guide channel connecting between the outlet 9 of the chute 8 and the pull tab receiving portion 10.

These clamping members 33, 34 include arms 39, 40 respectively. These arms extend in parallel to the direction in which the pull tab 4' supplied to the slider body 2 is falled down as hereinafter explained. These arms 39, 40 are pivoted to a sliding member 44 by means of a single shaft 43 at their intermediate positions between the clamping members 33, 34 and end portions 41, 42 thereof.

The sliding member 44 is slidably mounted within a channel in a machine base and is connected to an up and down movable rod 48 through a link 46 and a bell crank 47. The bell crank 47 is pivoted to the base. When the rod 48 is moved downwardly and upwardly, the sliding member 44 is retracted in the direction of the arrow (FIG. 2) and advanced in the opposite direction respectively. This up and down movement of the rod 48 is effected by a drive means not shown.

On opposite sides of this sliding member 44, a pair of fixed cams 49, 50 is fixed on the machine base 6.

On the rear end portions 41, 42 of each of the arms 39, 40, rollers 51, 52 are pivoted respectively. A spring 53 is compressed between the end portions 41 and 42 so that it resiliently pushes the end portions outwardly. By this, the rollers 51, 52 are resiliently urged to the cam surfaces of the fixed cams 49, 50.

These fixed cams 49, 50 include first parallel cam surfaces 54, 55 on the forward side thereof and second parallel cam surfaces 56, 57 on the rearward side thereof. The space between the first cam surfaces 54, 55 is wider than that of the second cam surfaces 56, 57. The space between the first cam surfaces 54, 55 is so selected that the guide channel which smoothly guides the opposite sides of the pull tab is formed by the slots 37, 38 of the clamping members 33, 34 when the rollers 51, 52 are in contact with the cam surfaces 54, 55. The space between the second cam surfaces 56, 57 is so selected that the end portions 41, 42 are closed to each other, thus the clamping members 33, 34 are separated from each other and the space between the slots 37, 38 of the clamping members is opened wider than the width of the pull tab when the rollers 51, 52 are in contact with the second cam surfaces 56, 57. The fixed cams 49, 50 include tapered surfaces 58, 59 which allow excess opening of the clamping members 33, 34.

Figure 3:
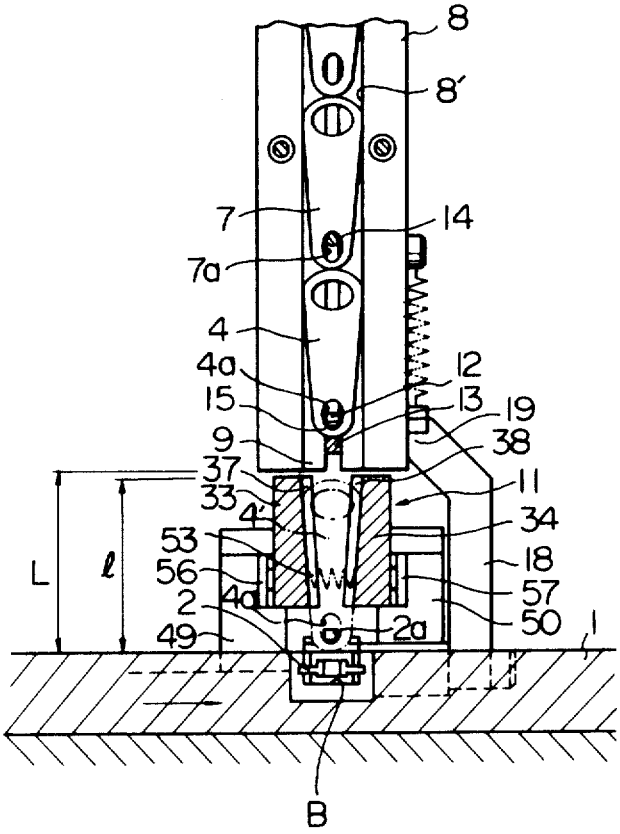
FIG. 3 is a sectional view taken along line III—III of FIG. 2.

The operation of the apparatus is as follows. Before starting of the loading operation, the pull tabs 4, 7—are received within the channel 8' as shown in FIGS. 2 and 3, the first pin 12 and the second pin 13 are engaged in the hole 4a and bottom end 15 of the lowermost pull tab 4 respectively, and the third pin 14 is positioned at disengaging position against the next adjacent pull tab 7. In this position, the arcuate forward end 23 of the detector 22 projects within the moving path of the slider body 2 in the recess B.

With such arrangement, when the recess B is rotated by the rotation of the turret 1 and comes to the position of FIG. 1, the rotation of the turret 1 is stopped and the detector 22 is rertracted against the force of the spring 24 by the engagement between the arcuate forward end 23 of the detector 22 and the slider body 2 received in the recess B. By this, the first pin 12 is retracted to the disengaging position.

However, if there is no slider body 2 within the recess B, as the arcuate forward end 23 of the detector 22 is not engaged by the slider body 2, the fist pin 12 is retained in its engaging position, and thus the supplying of a pull tab from the chute 8 is prevented despite the further operation of the other portions.

In response to the stop of the turret rotation, the shaft 3 is lowered and thus the cam follower 30 is pushed by the cam projection 32 of the cam 31. By this, the rocking arm 25 is rotated in the direction of the arrow in FIG. 2, and the second pin 13 is disengaged from the lower end 15 of the lowermost pull tab 4; at the same time the third pin 14 engages the above next adjacent pull tab 7. Therefore, the lowermost pull tab 4 is slid down toward the pull tab receiving portion 10 of the recess B and is positioned at 4' as shown in FIG. 3. However, the above adjacent pull tab 7 is retained in its position by the third pin 14. After this, the shaft 3 is moved upwardly and the engagement between the cam projection 32 and the cam follower 30 is broken. By this, the rocking arm 25 is returned to its original position by the spring 29, and thus, the third pin 14 is returned to the disengaging position and the second pin 13 is returned to the engaging position. Therefore, the above adjacent pull tab 7 is slid down and its lower end is engaged by the second pin 13 in preparation for the next cycle.

When the pull tab 4 is slid down in the position 4' of FIG. 3, the forward end of this pull tab 4' reaches the pull tab receiving portion 10 of the recess B and both side edges of the pull tab 4' are received within the slots 37, 38 of the clamping members 33, 34. At this time, the rod 48 is lowered by the operation of interlocking mechanism (not shown), whereby the sliding member 44 is initiated to retract in the direction of the arrow in FIG. 2.

When the sliding member 44 is retracted, the rollers 51, 52 of the arms 39, 40 are first guided by the widely spaced first parallel cam surfaces 54, 55 and the space between the slots 37, 38 of the clamping members 33, 34 is not changed. By this, the pull tab 4' is held and moved by the slots 37, 38 of the clamping members 33, 34 in the direction of the arrow, and the lower attaching hole 4a of the pull tab 4' is fitted over the lug 2a of the slider body 2 through the receiving opening 2b of the lug 2a. When the sliding member 44, i.e., the clamping member 33, 34, is further retracted in the direction of the arrow, the rollers 51, 52 are guided by the narrower second parallel cam surfaces 56, 57. By this, the space between the slots 37, 38 of the clamping members 33, 34 is opened wider than the width of the pull tab 4', and therefore, the pull tab 4' is released from holding by the clamping members 33, 34. As the release of this holding is effected during the retracting movement of the clamping members 33, 34 in the direction of the arrow, the pull tab 4' falls down on the slider body 2 in the direction of the arrow when it is released from the holding.

After this, the rod 48 is moved upwardly whereby the clamping members 33, 34 are returned to their original position as shown in FIGS. 1 and 2 in preparation for the next cycle.

After completion of this returning of the clamping members 33, 34 to their original position, the turret 1 is rotated. When the turret 1 is rotated, the arcuate forward end 23 of the detector 22 is disengaged from the slider body 2 in the recess B and returns to its projected position. Therefore, the first pin 12 again engages the hole 4a of the lowermost pull tab.

Although, in the above stated embodiment, the first pin 12 and third pin 14 are engaged in the holes 4a, 7a provided in the end portion of the pull tabs to hold them in position, the engagement of pins in the holes 4a, 7a is not always necessary. Alternatively, the pull tabs can be held in position by pushing the surfaces thereof by the pins 12, 14. Also, in the above stated embodiment, although the pull tab 4' is loaded on the slider body 2 by fitting the attaching hole 4a of the pull tab over the lug 2a of the slider body 2, such fitting of the hole over the lug is not always necessary for attaching the pull tab to the slider body. The pull tab may be loaded on the slider body by supplying it to the pull tab receiving portion of the recess and thereafter directly falling down on the slider body. In such a case, the fixed cams 49, 50 of FIG. 1 are replaced by ones which include the second parallel cam surfaces 56, 57 on the forward side of the fixed cams and the pull tab, which is received in the pull tab receiving portion 10 of the recess B, may be dropped directly onto the slider body by just moving and opening the clamping members 33, 34.

Thus, in accordance with the present invention, since the supply of the pull tabs to the slider body is effected by using gravity on the pull tabs and up and down movement of the shaft of the machine, no specific drive means and drive source is necessary. Also, since one by one supply of the pull tab to the slider body is effected by use of simple pins, rocking arm, cam and cam follower, the construction of the apparatus is very simple. Moreover, since the detector is mechanically operated by use of turret rotation, few trouble occurs and no specific energy source is needed to the detecting operation. Further, since the pull tab is dropped on to the slider body by use of the pull tab holding means, the pull tab always falls down on the slider body in the proper position.

What is claimed is:

1. An apparatus for loading a pull tab on a slider body in a machine for progressively assembling sliders for slide fasteners, said machine comprising a base, a turret supported on the base for intermittent rotation about its center axis and having a plurality of spaced-apart recesses arranged circumferentially around and on said turret for receiving and holding a slider body, a plurality of assembling stations arranged around the periphery of said turret, and means for intermittently rotating said turret so as to position a slider body holding recess successively opposite each of the stations, said apparatus being at one assembling station of said assembling stations and comprising a pull tab supply means and a pull tab holding means; said pull tab supply means includes a holder provided on the base, a chute supported by said holder and extending substantially vertically for receiving longitudinally aligned pull tabs therein and directing them toward a pull tab receiving portion in said recess by gravity, and means for discharging pull tabs one by one from the chute; said pull tab holding means is positioned between an outlet of said chute and the pull tab receiving portion of said recess and is movable between an advanced position and a retracted position; said pull tab holding means being arranged to form a guide channel for receiving a pull tab discharged from the chute between said outlet of said chute and the pull tab receiving portion of said recess in said advanced position, and means for opening the guide channel in said retracted position to thereby release a pull tab therefrom to drop said tab into said pull tab receiving portion of said turret recess.

2. An apparatus for loading a pull tab on a slider body as defined in claim 1 wherein said means for discharging pull tab one by one from the chute comprises a detecting means slidably mounted on said base between a projected position and a retracted position, a forward end of said detecting means being within the path of rotational movement of said slider body received within said recess upon rotation of said turret in said projected position; a spring means for urging said detecting means toward the projected position; a first pin fixed to said detecting means and being projectable into said chute, said first pin engaging and disengaging the lowermost pull tab in the chute when said detecting means is in its projected position and retracted position respectively; a rocking arm swingably mounted at an intermediate portion thereof to said chute and having a second pin and third pin on a lower end portion and an upper end portion respectively, said second and third pins being projectable into said chute, said rocking arm being swingable between a first position wherein said second pin and third pin engages and disengages a lower end of said lowermost pull tab and a next above adjacent pull tab respectively, and a second position wherein said second pin and third pin disengage and engage said lower end of said lowermost pull tab and said next above adjacent pull tab respectively; a spring means normally urging said rocking arm into said first position; a cam provided on said turret; and a cam follower mounted on said rocking arm and being engageable with said cam, means moving said cam downwardly upon intermittent stopping of the turret to thereby move said rocking arm into said second position thereof.

3. An apparatus for loading a pull tab on a slider body as defined in claim 1 wherein said pull tab holding means comprises a sliding member slidably mounted on said base between said advanced position and said retracted position; a pair of opposed clamping members having forward and rear end portions, said members being pivoted at intermediate portions thereof to said sliding member; a pair of fixed cams positioned on opposite sides of said clamping members, each forward end portion of said clamping members having a slot for forming said guide channel between clamping members, each rear end portion of said clamping members having a roller for contacting the opposed fixed cam; a spring means provided between said clamping members for urging said rollers against the fixed cams; said fixed cams including first cam surfaces on forward sides thereof which cause the clamping members to form said guide channel and second cam surfaces on rearward sides thereof which cause the clamping members to open said guide channel wider than the width of the pull tab; and means for moving said sliding members between said first and second positions.

* * * * *